(No Model.) 3 Sheets—Sheet 1.
W. G. & W. R. GAITHER.
ELECTRIC MOTOR TRUCK.
No. 547,068. Patented Oct. 1, 1895.
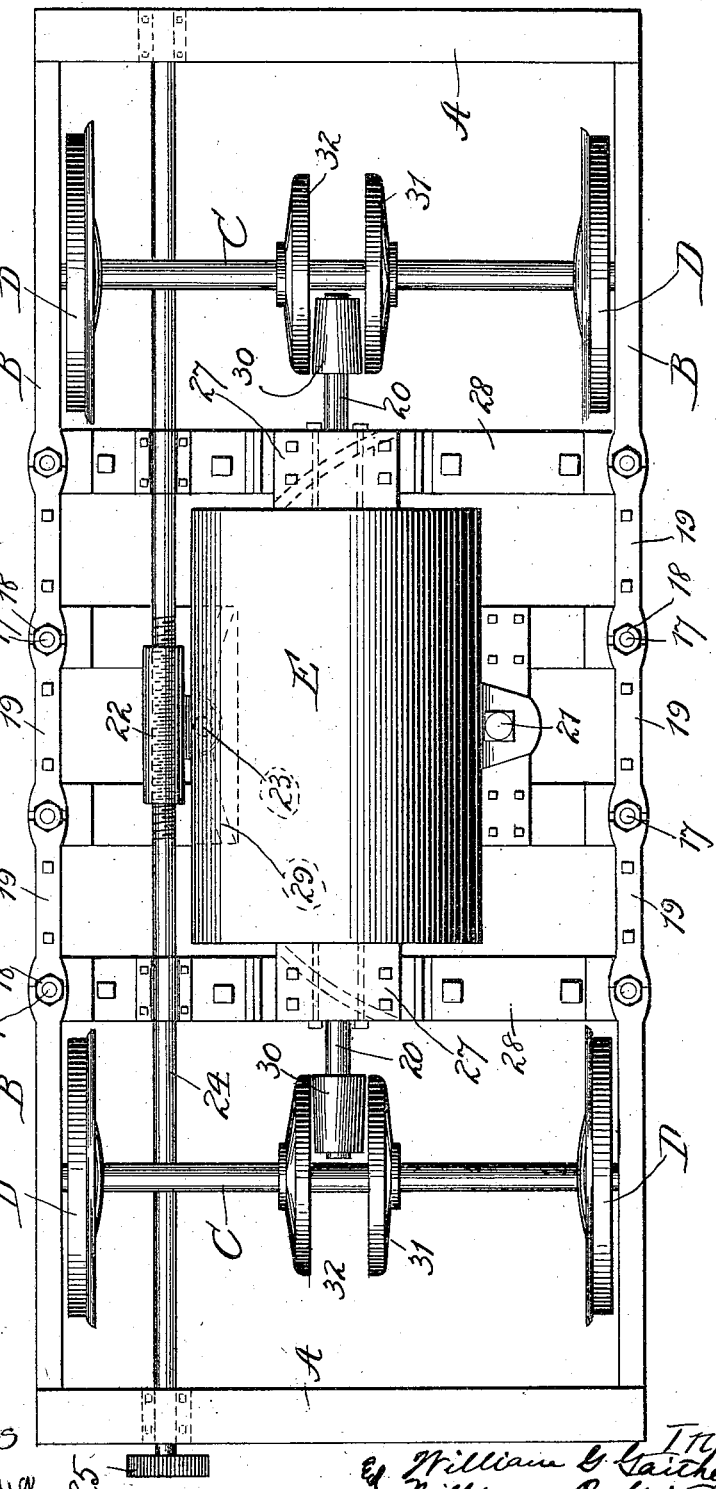
Witnesses
Wm. F. Henning
Harry White
Inventors
William G. Gaither
William R. Gaither
by Brown & Darby Attys

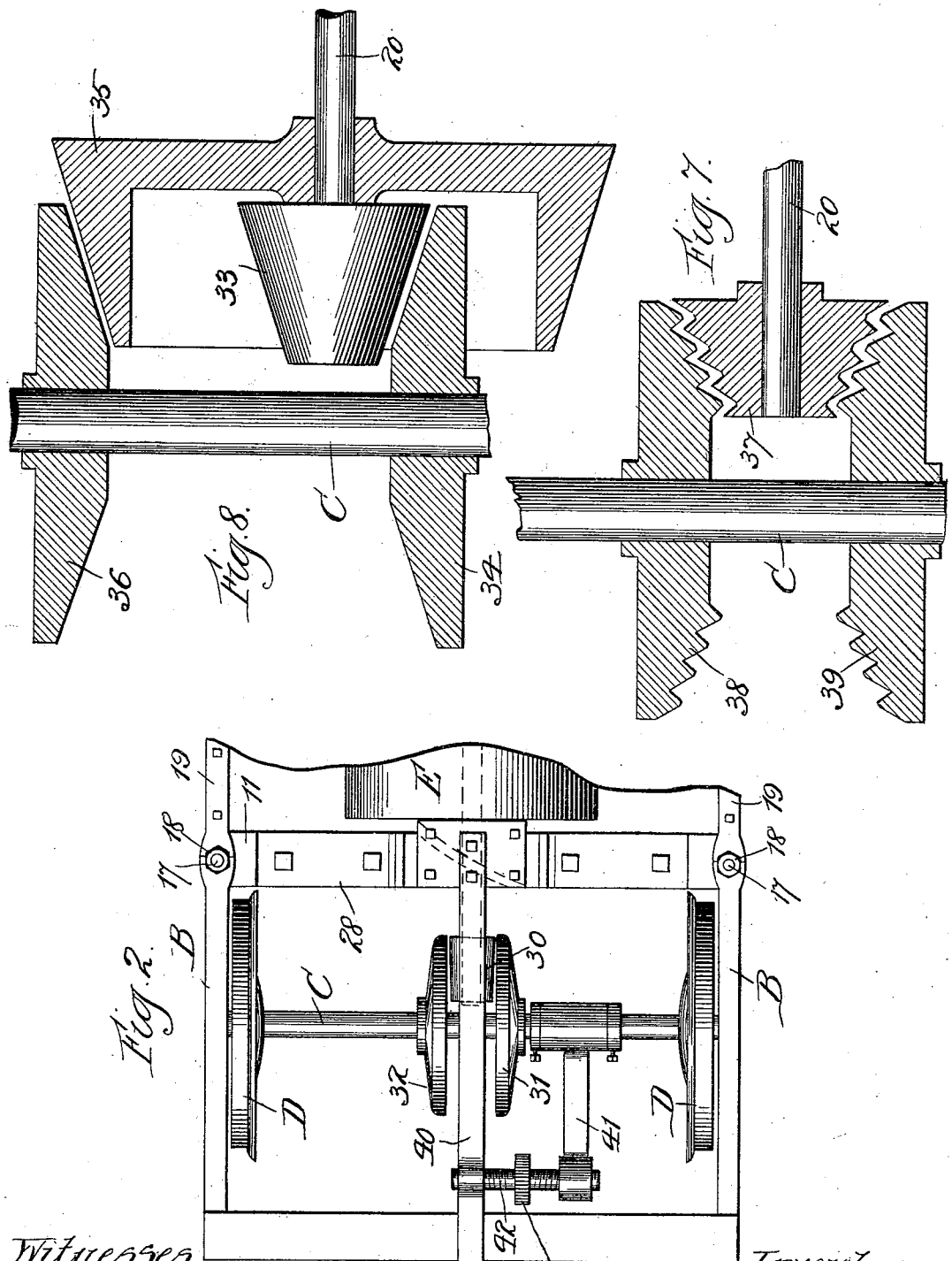

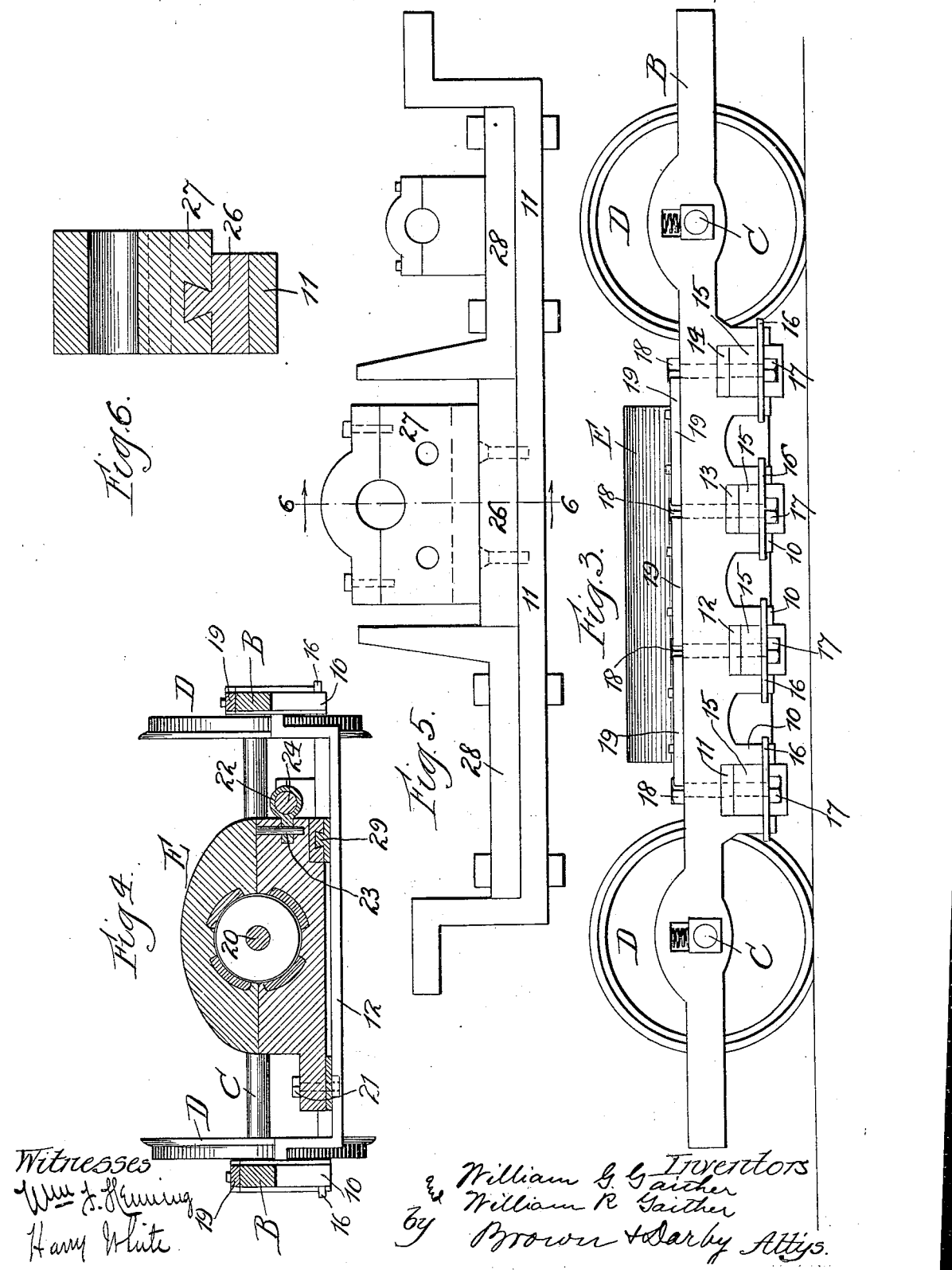

UNITED STATES PATENT OFFICE.

WILLIAM G. GAITHER AND WILLIAM R. GAITHER, OF CHICAGO, ILLINOIS.

ELECTRIC-MOTOR TRUCK.

SPECIFICATION forming part of Letters Patent No. 547,068, dated October 1, 1895.

Application filed November 10, 1894. Serial No. 528,380. (No model.)

*To all whom it may concern:*

Be it known that we, WILLIAM G. GAITHER and WILLIAM R. GAITHER, citizens of the United States, residing at Chicago, in the county of Cook and State of Illinois, have invented a new and useful Improvement in Electric-Motor Trucks for Railway-Cars, of which the following is a specification.

This invention relates to electric-motor trucks for railway-cars.

The object of the invention is to provide a motor-truck of novel construction and arrangement.

A further object is the provision of means for throwing the motor and the mechanism driven thereby out of operative relation with respect to each other in a simple, efficient, and positive manner.

Further objects of the invention will appear more fully hereinafter.

The invention consists, broadly, in a construction whereby a motor and translating devices are thrown into and out of operative relation in a simple and effective manner.

The invention also consists in a novel construction of truck-frame for removably supporting and sustaining the motor.

The invention also consists in so mounting the motor upon its supporting-frame that the motor and translating devices are thrown out of operative relation and the action of the translating devices arrested by a reverse application of power.

The invention also consists in various combinations, arrangements, and locations of parts, all as will be more fully hereinafter set forth, as shown in the accompanying drawings, and finally pointed out in the appended claims.

Referring to the accompanying drawings and to the various views and reference-signs appearing thereon, Figure 1 is a plan view of a form of our invention as applied to a motor-truck. Fig. 2 is a plan view, partly broken away, of a modified form of our invention. Fig. 3 is a side elevation of a motor-truck constructed in accordance with the principles of our invention. Fig. 4 is a vertical transverse sectional view of the same. Fig. 5 is a detail view showing a journal-box-supporting cross-bar detached, and also illustrating the manner of mounting the motor-shaft journal-box thereon, the said bar being in side elevation, looking from the front end of the truck. Fig. 6 is a sectional view taken on the line 6 6, Fig. 5. Fig. 7 is a view in horizontal section, showing a modified form of gearing which may be employed in carrying out our invention. Fig. 8 is a view in horizontal section of a modified form of mechanism embodying the principle of some of the features of our invention.

The same reference-signs are used throughout the several views to indicate the same part wherever it occurs.

In the drawings, A indicates the end bars of a motor-truck, and B the side bars thereof; C, the axles; D, the car-wheels, and E the motor. As these parts may be of any suitable form and construction, we do not deem it necessary to describe any specific construction, and we do not desire to be restricted to any specific form of these parts in carrying out the principles of our invention.

We will first describe the special features of construction of our motor-frame. In this part of our invention we provide the side pieces B of the motor-frame preferably from a single forging or casting, or in any other suitable manner, in one piece, with suitable openings for the boxes of axles C. Each bar B is provided with a series of pairs of projections 10, which may be of any desired or suitable shape in cross-section. While we have shown these projections cast or formed integrally with the side bars B, it will be obvious that they may be formed separately therefrom and suitably bolted or otherwise secured thereto. Each pair of projections 10 10 forms a box, in which is received one end of the cross-bars 11 12 13 14. A follower-plate 16, suitably perforated to receive projections 10, is provided. Arranged in the boxes formed by projections 10 and interposed between said follower-plate and the ends of the cross-bars are blocks 15, which may be rubber or springs, or, in the case of the boxes for the reception of cross-bars 11 and 14, these blocks may, if desired, be merely solid metal or wooden blocks. A bolt 17 is arranged to pass through suitable perforations in plate 16, block 15, the ends of the cross-bars, and the side bars B, as shown, the head of said bolt engaging on the under side of said plate, and the other end of said bolt adapted to receive a nut 18, as shown.

By this construction the frame upon which the motor is supported may be readily and easily removed from the truck-frame, when desired, for repairs or for other reasons, and by adjusting nuts 18 the tension of springs 15 may be adjusted and the motor-supporting frame may be adjusted. It will be understood that the follower-plates 16 slide freely upon the projections 10, and hence the perforations in said plate to receive said projections are formed to correspond with the shape in cross-section of said projections. In order to hold the nuts 18 in the desired position relative to each other and to lock them against possible disarrangement, we provide the locks 19, arranged to engage a pair of said nuts and suitably secure said locks to the bar B.

We will now describe the manner of mounting the motor upon the truck-frame in the application of our invention to a railway-car. Upon the framework formed by the cross-bars 11, 12, 13, and 14 we mount the motor, with the armature-shaft 20 thereof arranged lengthwise of the car. By this arrangement we avoid the necessity of gearing intermediate the gear on the armature-shaft and the gear on the car-axle, and at the same time secure a direct application of the power of the motor to the car-axle or other translating device. The motor is pivoted to its supporting-frame, as at 21, and suitably pivoted, as at 23, in a circular seat is a flanged sleeve 22, internally screw-threaded and adapted to receive the threaded portion of a shaft 24, extending longitudinally with respect to the car and having a suitable ratchet or other device, as at 25, conveniently arranged to be operated in any suitable manner, whereby the shaft may be actuated to feed the sleeve 22 back or forth on the screw-threaded portion of said rod, and hence rocking the motor upon its pivot, as will be readily understood, the pivoted connection of sleeve 22 being such as to permit said sleeve to move in a straight line, while permitting the motor to rock about its pivot. The journal-boxes for the armature-shaft are supported upon the end cross-bars 11 and 14, and inasmuch as the motor and shaft are designed to be rocked about a pivot provision is made for a sliding movement of the journal-boxes. This is accomplished by suitably securing to the bars 11 and 14 (see more particularly Figs. 5 and 6) a guide-block 26, having a dovetailed projection upon its upper surface adapted to be received in a correspondingly-shaped groove in the lower face of the lower half 27 of the journal-box. Removable plates 28 are suitably secured to the cross-bar in order to retain guide-blocks 26 in place, and also to form an abutting-stop to limit the movement of the journal-box. The dovetailed projection on guide-block is suitably curved to correspond with the direction of movement of the motor-axle when the motor is swung about its pivot. We provide a similarly dovetailed guide-plate 29 to support and guide the motor. Upon each end of the armature-shaft we mount a suitable gear arranged to engage a gear upon the axle C of the truck. In the forms shown in Figs. 1 and 2 the gears are shown in the form of plain friction-gears; but it is obvious that any desirable form of gearing suitable to the work required may be used. Friction-disks 31 32 are rigidly mounted upon the truck-axles and are arranged to be engaged by friction-wheels 30, mounted upon the armature-shaft. It will be observed that the gears 30 are slightly conical in shape. This is for the purpose of securing simultaneous contact between the friction-gears throughout the entire length of gears 30 when the motor is swung into position for the gears to engage each other. It will be understood, however, that the face of gears 31 32 may be beveled instead and the same result accomplished.

From the above description it will be seen that when the shaft 24 is suitably operated to rock the motor and its armature-shaft and hence the gears 30 into operative position to effect a propulsion of the truck or other translating device there is a simultaneous engagement between the driving and driven gears at each end of the armature-shaft, thus at the moment of starting the car or other device applying the full power of the motor to the work required. This is an important feature, for at that moment the greatest amount of work is required to overcome the traction due to gravity and the inertia of the parts.

When it is desired to stop the car or other translating device, the parts are so proportioned that a movement of the motor through a very small space in the opposite direction will effect a disengagement of the driving and driven gears, and the simultaneous application of the ordinary brake mechanism will effect a stopping of the car. Should it be necessary to effect what is known as a "short" stop, a further rocking of the motor will cause a simultaneous engagement of gears 30 and the opposite disks on the axle, so that without interrupting the current through the motor or without reversing its rotation the power thereof may be instantly applied to brake the movement of the car-axle and reverse its rotation. In some cases it may be desirable to use toothed gearing to effect the positive operation of the translating devices. In such a case of course the operation above described of reversing the rotation of the car-axle cannot be effected without danger and liability of breakage. In such instances we have provided a construction wherein either friction or toothed gearing may be employed and still effect automatically a braking of the axle. An example of this construction is shown in Fig. 8, wherein gear 33, mounted upon the armature-shaft 20, is arranged to engage a gear 34, mounted upon the axle. These gears may be either friction or toothed gears. Upon the armature-shaft we mount a friction-sleeve 35, arranged to engage a friction-disk 36 upon the axle. By this construction the motor may be rocked to effect a disengagement of the gears 33 34, and if it is desired to effect a quick stop the motor-frame is still further rocked to effect a frictional engagement of said gears 35 36.

In Fig. 7 we have shown a form of friction-gearing which may be conveniently employed in many instances. In this form of gearing the gears 37, 38, and 39 are grooved or serrated in their meeting faces, so that there is a gradual increase of friction-surface as the gears are moved toward each other.

We have shown in Fig. 2 a modified form of mechanism for effecting a rocking of the motor-frame. In this form we secure a bar 40 to a journal-box of the armature-shaft. Upon the car-axle we mount a sleeved arm 41, arranged to be held between collars rigidly mounted upon the axle, as shown. A right- and-left screw-threaded bolt 42 is arranged to engage the arm and bar, respectively. Upon bolt 42 is mounted a ratchet-wheel 43 or other suitable or convenient device, by which said bolt may be rocked to swing or rock the motor upon its pivot. The connection of said bolt with arm 41 or with bar 40 may be a pivotal connection, in order to provide for a slight swinging thereof when the motor is swung. Any suitable construction may be employed for this purpose. In many instances it may not be desirable to have an armature-shaft of sufficient length to span the space between the pair of axles on the truck. This being the case, we may provide any ordinary or preferred form of coupling device for adding an additional length of shafting to the motor-shaft.

While we have shown the motor-frame pivoted at one side to its support, it is evident that the pivot may be located at any other suitable or convenient place, it being understood that the curvature of the journal-box guides and of the motor-frame guide 29 is to be altered to correspond with the location of the pivot.

By the construction herein set forth we provide an exceedingly simple, effective, and inexpensive motor-truck, wherein the entire power of the motor is applied at the moment when the greatest power is required—namely, just at the point of starting the car. We have made provision for the braking of the car automatically and in a most simple and effective manner, so that the movement of the car is arrested quickly, thus practically providing an emergency-brake. We have provided an arrangement capable of being easily dismembered for repairs or examination and which economizes the power required to operate the motor in a remarkable degree.

While we have shown and described our invention as applied to a motor-truck, it will be obvious that it may be used in many other relations where generally the application of a driving-engine to a translating device is desired. It will also be understood that instead of moving the motor to throw the gearing into operative relation we may, if desired, maintain the motor fixedly and move the gears on the axle into engagement with the gear on the motor-shaft.

While we have shown a single motor, it will be understood that our invention is board enough to cover two or more motors mounted upon the truck-frame having the same armature-shaft, or with their shafts suitably coupled up. This construction may be employed where it is desired to apply an increased motive force to the truck-axles.

If desired, the rock-shaft 24 may be extended and employed to rock a second motor upon another truck-frame supporting the opposite end of the car. In this case the car will be provided with two trucks, each having a pair of axles, as will be readily understood.

Many other modifications in the details of construction and in the location and relative arrangement of parts would readily suggest themselves to any one skilled in the art or science to which the present invention relates and still fall within the spirit and scope of the invention. We do not desire, therefore, to be limited to the exact details shown and described; but, having now set forth the principle of our invention and explained the mode of operation of a structure embodying the same.

What we claim as new, and desire to secure by Letters Patent of the United States, is—

1. A motor truck frame comprising side-bars having seats formed therein, cross bars having their ends arranged in said seats, adjustably supporting plates for the ends of said cross bars also arranged in said seats, springs interposed between said plates and cross bars, and means for retaining said plates in place; as and for the purpose set forth.

2. A motor truck frame comprising side bars provided with seats, cross bars having their ends arranged in said seats supporting plates for the ends of said cross-bars, also arranged in said seats, springs interposed between said plates and cross bars, and a bolt arranged to adjustably maintain said plates in place; as and for the purpose set forth.

3. In a motor truck frame, side bars having projections forming seats, cross bars arranged therein, a plate arranged to slide upon said projections, a spring interposed between said plate and cross-bar and a bolt arranged to retain said plate in place; as and for the purpose set forth.

4. The combination in a motor truck of a truck frame, supporting axles therefor, a gear mounted upon one of said axles, a motor pivotally mounted upon said truck frame to swing horizontally thereon, a gear mounted upon the motor shaft, and means for swinging said motor horizontally about its pivot; as and for the purpose set forth.

5. The combination with a truck frame, supporting axles therefor, gears mounted thereon, of a horizontally pivoted motor arranged longitudinally of the truck frame and having gears upon the shaft thereof, and means for rocking said motor about its pivot, whereby said gears are thrown into or out of operative relation; as and for the purpose set forth.

6. The combination with a truck frame having a pair of supporting wheels and a connecting axle at each end thereof and gears mounted on said axles, of a horizontally pivoted motor arranged between said axles, and having the shaft thereof arranged transverse with respect to said axles, and gears mounted thereon, and means for rocking said motor, whereby the two sets of gearing are simultaneously moved out of or into operative relation; as and for the purpose set forth.

7. The combination in a motor truck, of supporting axles, a pivoted motor for driving said axles, and means for rocking said motor about its pivot, comprising a shaft, a link connecting said shaft and motor, and means for rocking said shaft; as and for the purpose set forth.

8. In a motor truck, axles, a pivoted motor for driving the same, and means for rocking said motor upon its pivot, comprising a shaft and pivoted connections between said shaft and motor; as and for the purpose set forth.

9. In a motor truck, supporting axles, a pivoted motor for driving the same, and means for rocking said motor upon its pivot, comprising a shaft having screw threads, an internally screw-threaded sleeve, pivotally connected to said motor and adapted to receive the threaded portion of said shaft; as and for the purpose set forth.

10. In a motor truck a supporting axle therefor, a pair of gears mounted thereon to rotate therewith, a motor, a gear mounted upon the shaft thereof, and means for moving said gear alternately into and out of engagement with the gears upon the axle, and relieving the driving power from the axle and simultaneously therewith applying a brake thereto; as and for the purpose set forth.

11. In a motor truck, a supporting axle, a pair of gears mounted thereon to rotate therewith, a motor, a gear mounted upon the shaft thereof and arranged between said gears upon the truck axle, and means for moving the motor shaft and gear carried thereby in a direction to engage one and then the other of said gears upon the axle, thereby positively driving arresting or reversing the truck axle; as and for the purpose set forth.

12. In a motor truck, an axle having a pair of grooved gears mounted thereon to rotate therewith, a pivoted motor having a grooved gear mounted upon the shaft thereof, and arranged between the pair of grooved gears upon the truck axle, and means for rocking said motor about its pivot, whereby said gears are moved into and out of operative relation with respect to each other, thereby positively driving or reversing said axle or relieving it of propelling power; as and for the purpose set forth.

13. In a motor truck, a pivoted motor, a pair of movable journal boxes for the armature shaft of said motor, guides in which said journal boxes move, and means for rocking said motor about its pivot; as and for the purpose set forth.

14. In a motor truck supporting axles having gears thereon, a pivoted motor, having gears upon the armature shaft thereof, means for rocking said motor about its pivot whereby said gears are moved into and out of operative relation, and a curved guide for each of said motors; as and for the purpose set forth.

15. In a motor truck, supporting axles, having gears thereon, a pivoted motor having gearing upon the shaft thereof, means for rocking said motor about its pivot, whereby said gears are moved into and out of operative relation with respect to each other, and a curved dovetailed guide for said motor, as and for the purpose set forth.

16. In a motor truck, supporting axles having gears thereon, a pivoted motor having gearing upon the shaft thereof, movable journal boxes for said shaft, means for rocking said motor about its pivot, and curved guides for guiding said journal boxes; as and for the purpose set forth.

17. In a motor truck, a pivoted motor, movable boxes for the shaft thereof, a guide in which said boxes move and stops arranged to limit the movement of said boxes; as and for the purpose set forth.

18. In a motor truck, a pivoted motor, movable boxes for the shaft thereof, cross bars, guides carried by said cross bars and arranged to support and guide said boxes; as and for the purpose set forth.

19. In a motor truck a pivoted motor, movable boxes for the shaft thereof, cross bars, curved dovetailed guides carried thereby the lower halves of said boxes provided with dovetailed grooves adapted to receive said guides, and means for rocking said motor; as and for the purpose set forth.

In witness whereof we have hereunto set our hands this 7th day of November, 1894.

WILLIAM G. GAITHER.
WILLIAM R. GAITHER.

In presence of—
S. E. DARBY,
M. I. CAVANOGH.